US010667587B1

(12) United States Patent
    Shannon, III

(10) Patent No.: US 10,667,587 B1
(45) Date of Patent: Jun. 2, 2020

(54) REAR CAMERA HOOD

(71) Applicant: BobjGear, LLC, Clermont, FL (US)

(72) Inventor: Robert James Shannon, III, Clermont, FL (US)

(73) Assignee: BOBJGEAR, LLC, Clermont, CT (US)

( * ) Notice: Subject to any disclaimer, the term of this patent is extended or adjusted under 35 U.S.C. 154(b) by 0 days.

(21) Appl. No.: 16/205,894

(22) Filed: Nov. 30, 2018

(51) Int. Cl.
   *H04M 1/00*     (2006.01)
   *A45C 11/00*    (2006.01)
   *G03B 11/04*    (2006.01)

(52) U.S. Cl.
   CPC .......... *A45C 11/00* (2013.01); *G03B 11/045* (2013.01); *A45C 2011/002* (2013.01); *A45C 2011/003* (2013.01)

(58) Field of Classification Search
   CPC . H04W 88/02; H04M 1/0214; H04M 1/0283; H04M 1/18; H04M 1/23; H04M 1/0247; H04M 1/0237
   USPC ................ 455/550.1, 575.1, 575.8, 90.3
   See application file for complete search history.

(56) References Cited

U.S. PATENT DOCUMENTS

| 2013/0177302 | A1* | 7/2013 | Weber | G06F 1/1626 396/155 |
| 2014/0176779 | A1* | 6/2014 | Weber | G06F 1/1626 348/335 |
| 2017/0142242 | A1* | 5/2017 | O'Neill | H04B 1/3888 |
| 2018/0045910 | A1* | 2/2018 | O'Neill | G02B 7/14 |
| 2018/0146084 | A1* | 5/2018 | Diebel | G03B 17/02 |

* cited by examiner

*Primary Examiner* — Temica M Beamer
(74) *Attorney, Agent, or Firm* — Perman & Green, LLP

(57) ABSTRACT

An electronic device protection apparatus conformal with an electronic device including a retaining sheath having a base section disposed so as to substantially cover the rear of the electronic device, and a rim section, including an inner channel, forming a perimeter around and receiving an exterior edge of the electronic device, at least one aperture defined by and extending through one or more of the base section and the rim section, the aperture configured such that an edge of the aperture at least partially surrounds a camera and flash unit of the electronic device, and at least one hood defined by and projecting from the one or more of the base section and the rim section such that the hood and the one or more of the base section and the rim section are a unitary member, wherein the hood substantially surrounds at least a portion of the edge of the aperture and is configured so as to define a non-reflective pass through, non-reflective of flash illumination of the flash unit with respect to the camera.

20 Claims, 17 Drawing Sheets

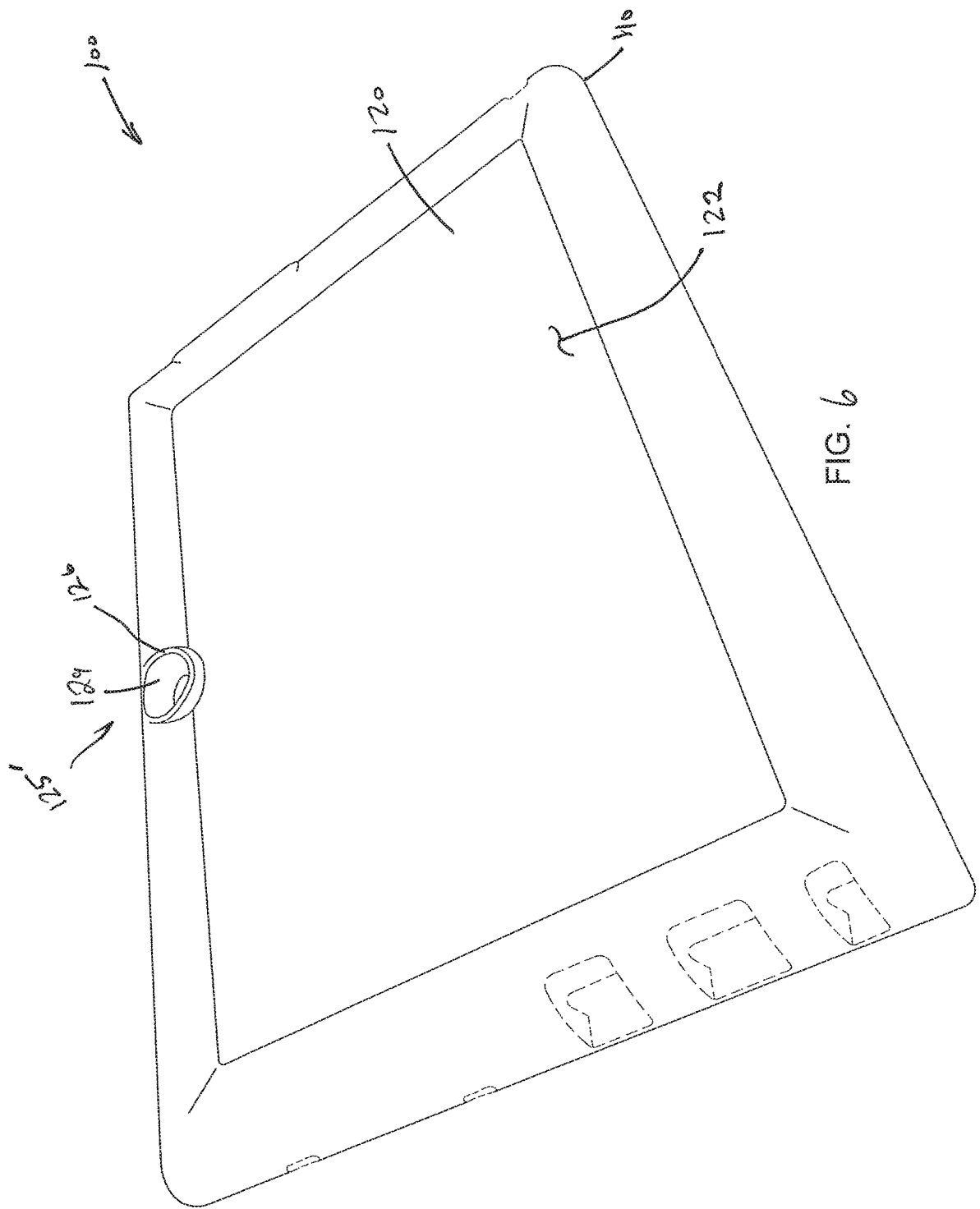

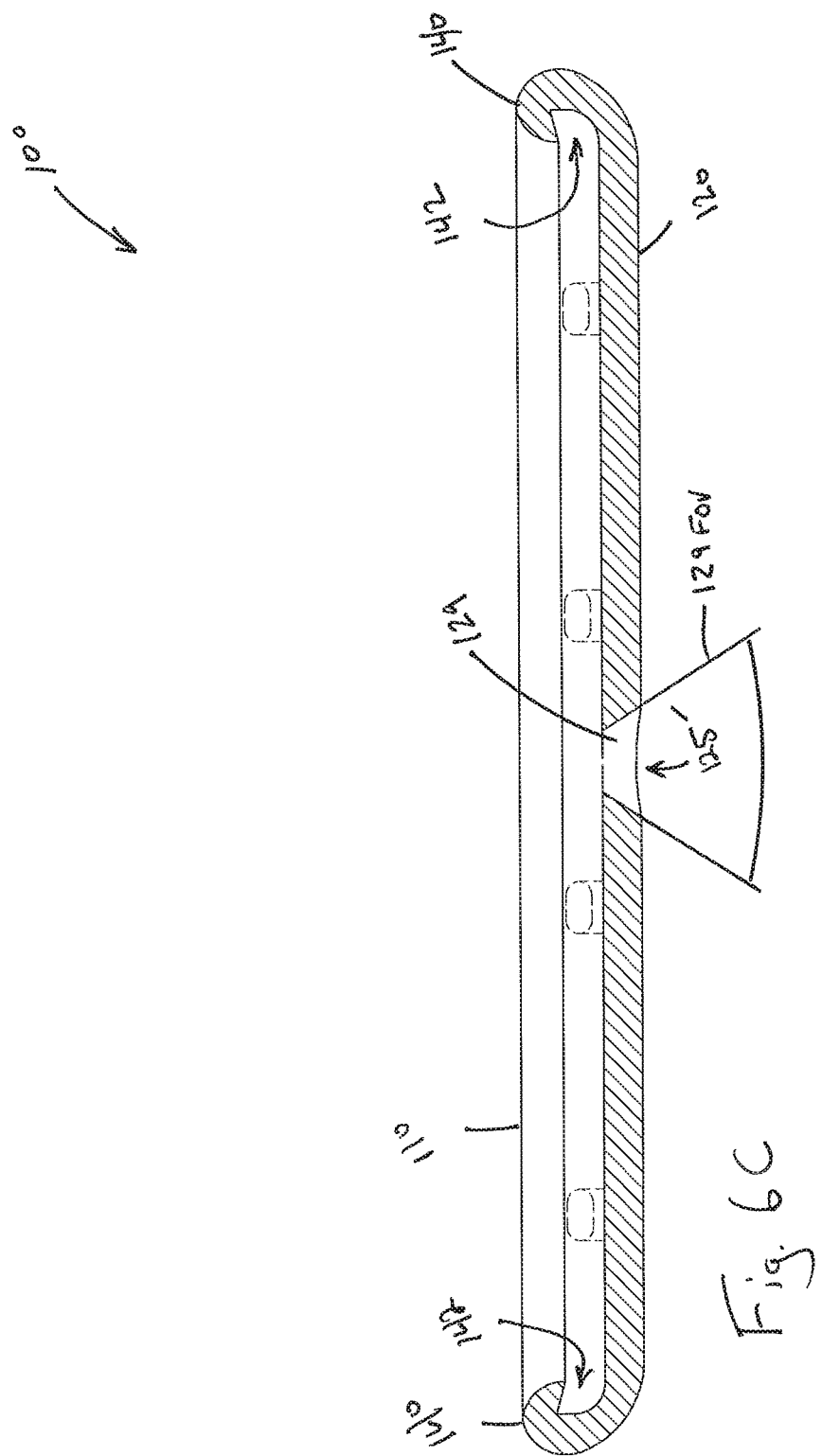

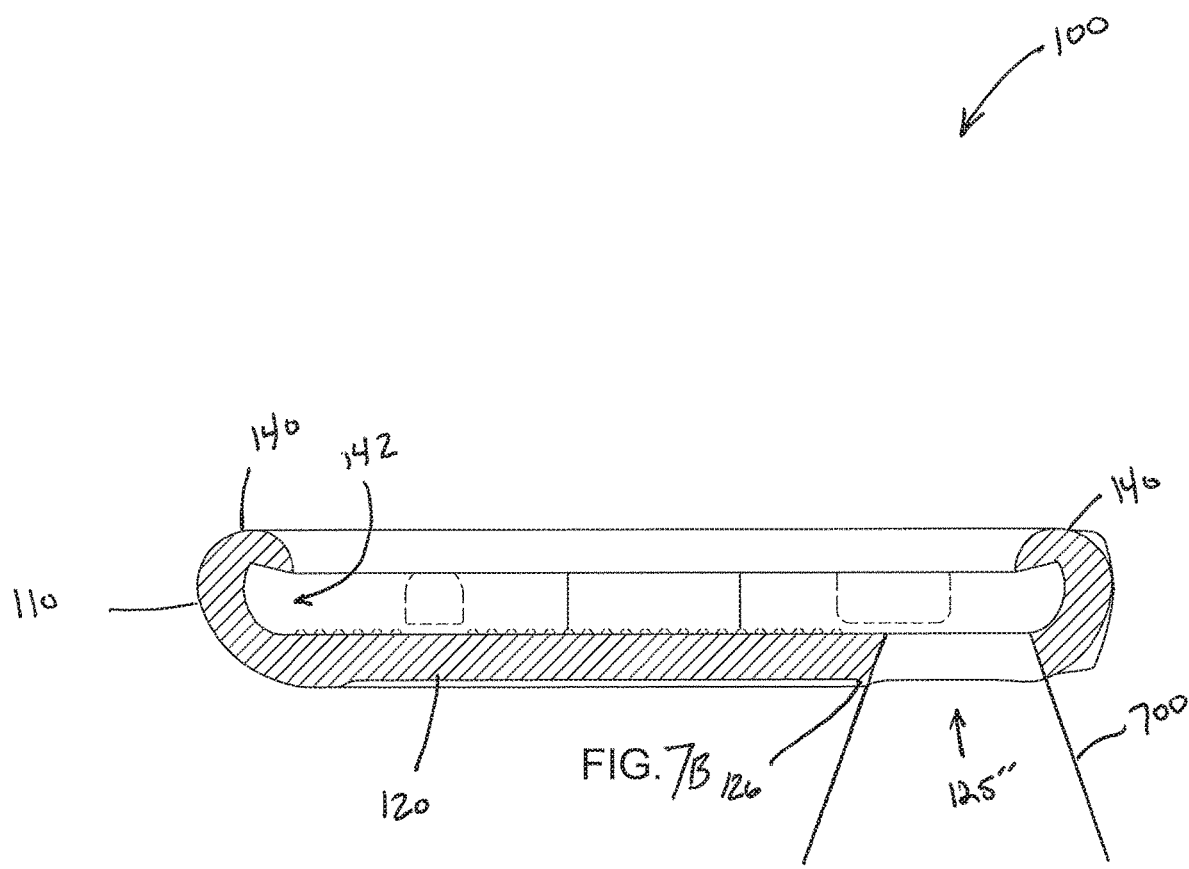

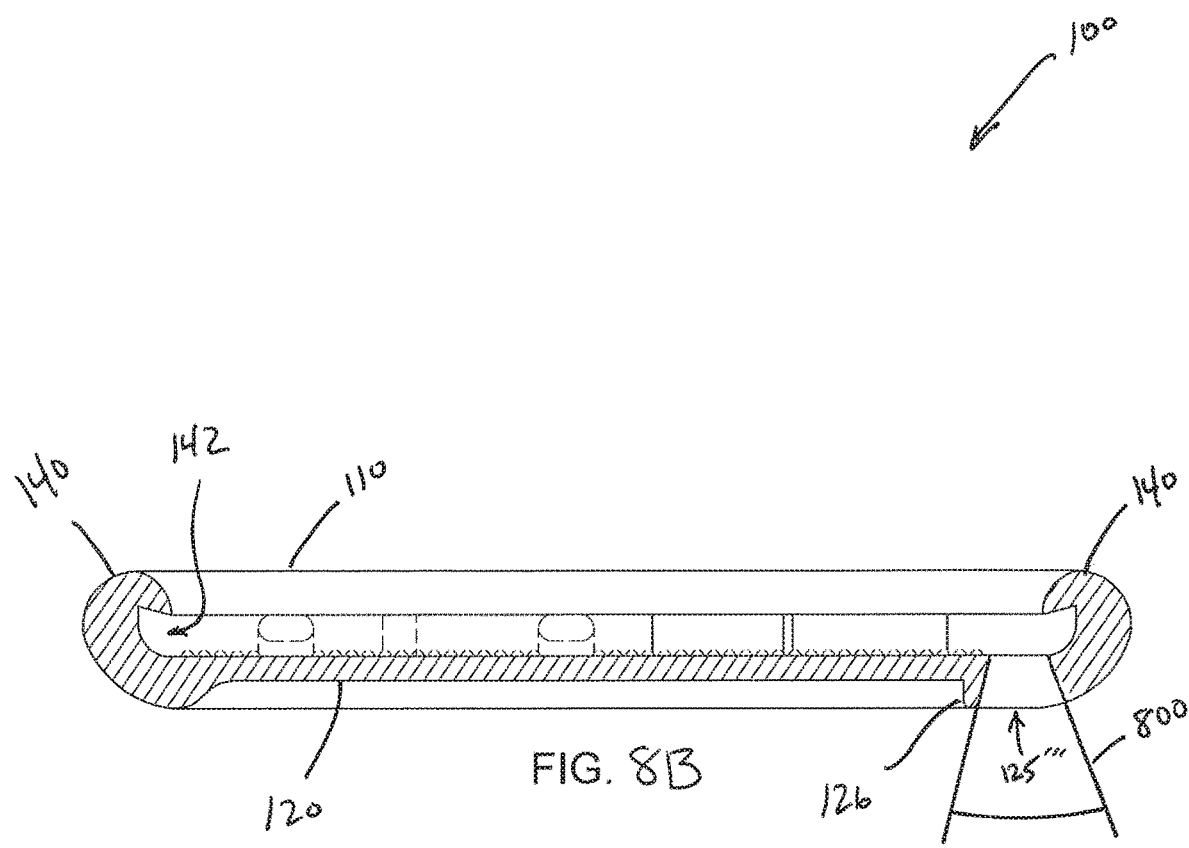

US 10,667,587 B1

REAR CAMERA HOOD

BACKGROUND

1. Field

The aspects of the present disclosure generally relate to electronic device accessories, and more particularly to electronic device cases.

2. Brief Description of Related Developments

Electronic device cases have proven to be a valuable tool for the physical protection of sensitive electronic devices such as, for example, tablets and smartphones. Conventional cases have provided protection to electronic devices by encompassing nearly the entire device, with the exception of the screen.

A disadvantage of conventional cases is that, for electronic devices possessing cameras with a flash unit, these conventional cases can obstruct the use of the camera functionality. For example, the conventional case may block the lens of the electronic device, or the flash unit of the camera may reflect off the conventional case and cause a glare to form on photographs and videos taken by the camera. In some instances, an additional dark colored plastic piece may be added to the conventional case to reduce reflectivity or dark colored paint may be applied to the conventional case. However, these additional pieces are subject to being dislodged or broken in the event of dropping of the conventional case, or the paint may flake and fall off. Thus, it would be advantageous for a case to include an integrated camera hood to provide physical protection to electronic devices without compromising functionality of the camera and the flash unit.

BRIEF DESCRIPTION OF THE DRAWINGS

The foregoing aspects and other features of the present disclosure are explained in the following description, taken in connection with the accompanying drawings, wherein:

FIG. 6 is a back-perspective view illustration of an exemplary electronic device protection apparatus in accordance with one or more aspects of the present disclosure;

FIGS. 6B-6C are schematic cross-sectional view illustrations of a portion of the exemplary apparatus of FIG. 6 in accordance with one or more aspects of the present disclosure;

FIGS. 7B-7C are schematic cross-sectional view illustrations of a portion of the exemplary apparatus of FIG. 7 in accordance with one or more aspects of the present disclosure;

FIGS. 8B-8C are schematic cross-sectional view illustrations of a portion of the exemplary apparatus of FIG. 6 in accordance with one or more aspects of the present disclosure.

DETAILED DESCRIPTION

Figure 1:
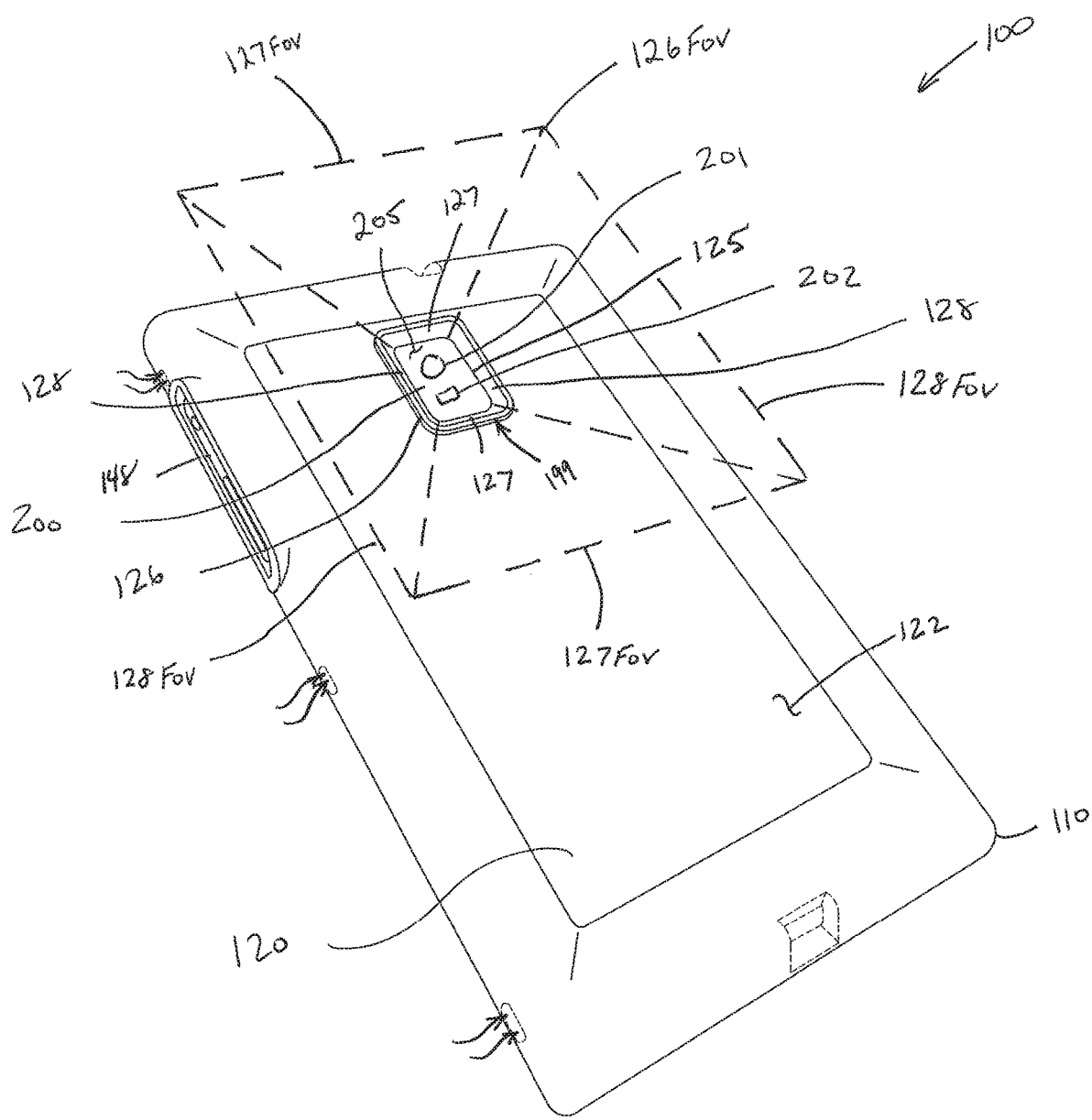
FIG. 1 is a schematic back-perspective view illustration of an exemplary electronic device protection apparatus in accordance with one or more aspects of the present disclosure.

FIG. 1 is a schematic illustration of an electronic device protection apparatus 100 in accordance with aspects of the present disclosure. Although the aspects of the present disclosure will be described with reference to the drawings, it should be understood that the aspects of the present disclosure can be embodied in many forms. In addition, any suitable size, shape, or type of elements or materials could be used.

As will be described in greater detail below, the aspects of the present disclosure described herein provide for the electronic device protection apparatus 100 configured to conform to a corresponding electronic device 200 and provide the electronic device 200 with physical protection features desirable in an electronic device case, while preserving functionality of a camera 201 and a flash unit 202 of the electronic device 200 (i.e., limited obstruction or glare on photographs/videos taken by the camera 201 of the electronic device 200). It is noted that, as used herein, the term "electronic device" may be indicative of any tablet, touchpad, smartphone, laptop, electronic display or any other suitable electronic device having a camera.

Figure 2:
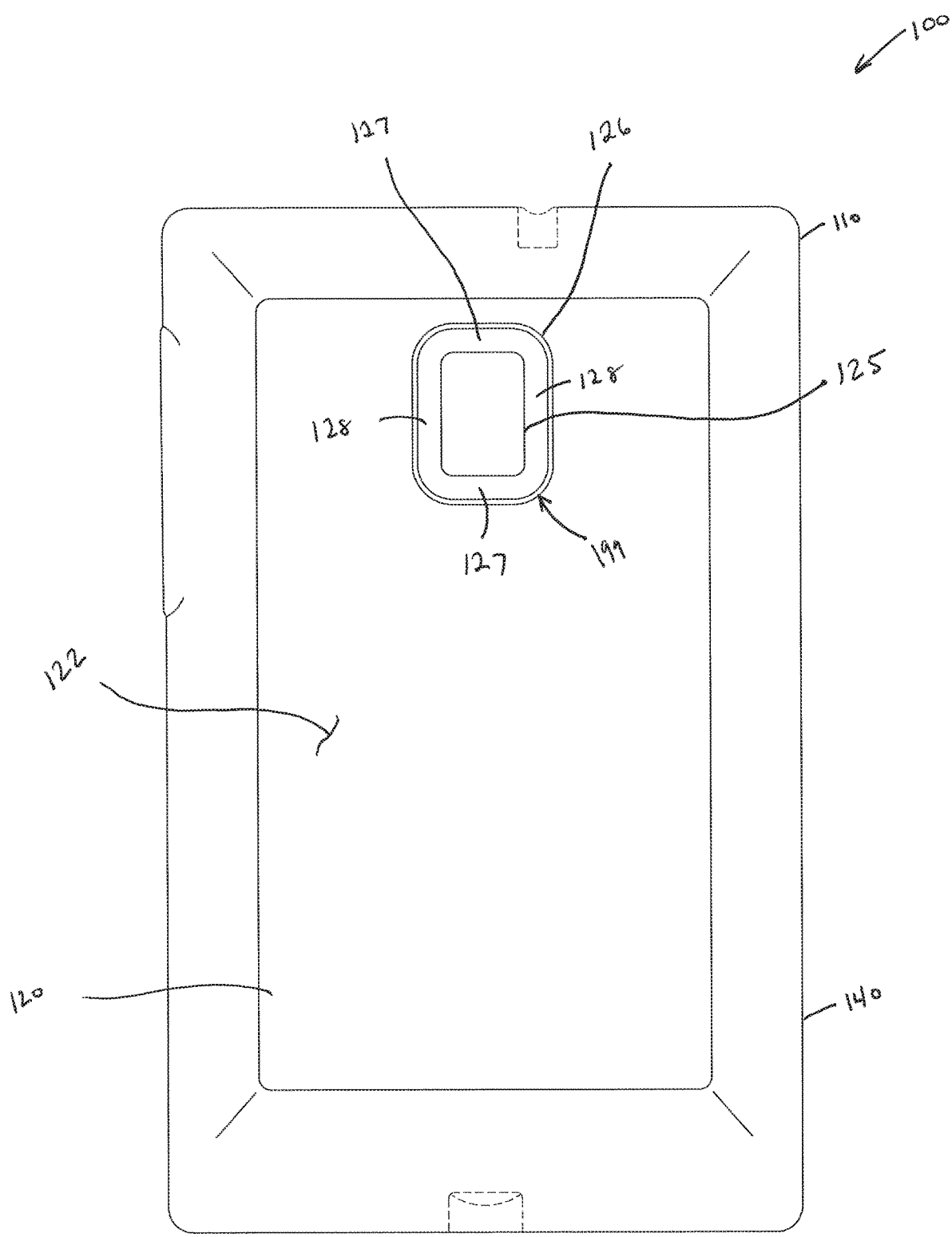
FIG. 2 is a schematic back view illustration of the exemplary apparatus of FIG. 1 in accordance with one or more aspects of the present disclosure.
Figure 3:
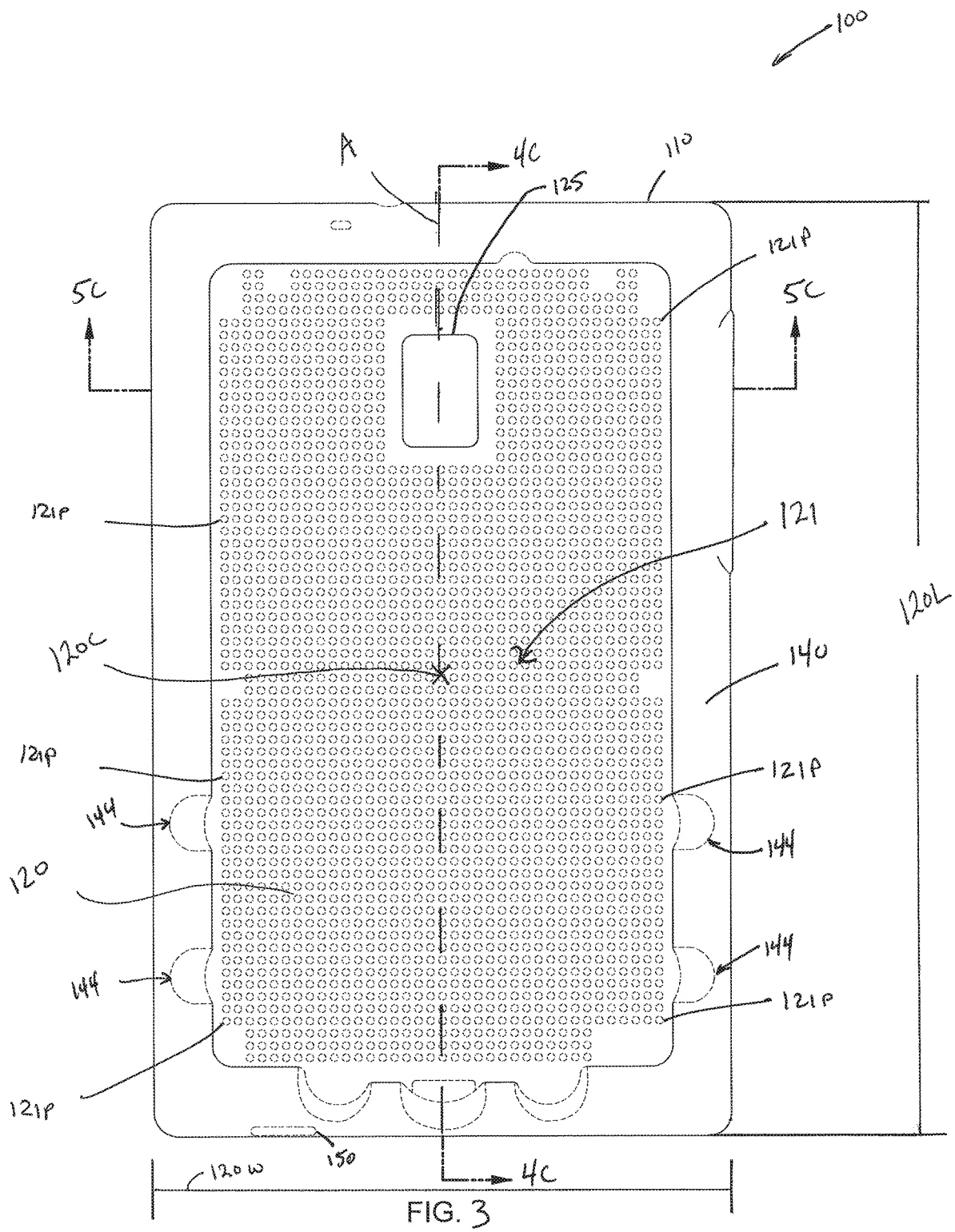
FIG. 3 is a schematic front view illustration of the exemplary apparatus of FIG. 1 in accordance with one or more aspects of the present disclosure.

Referring to FIGS. 1, 2 and 3, in one aspect, the electronic device protection apparatus 100 includes a retaining sheath 110 having a base section 120 and a rim section 140 (FIG. 3) extending from the base section 120 as will be described herein. The electronic device protection apparatus 100 is generally formed from any suitable material or combination of materials, such as, e.g., plastic, composite, or any other suitable material. The material or combination of materials may be rigid or flexible and, in one aspect, may include shock-absorbing characteristics (i.e., absorption or damping of impact forces due to, e.g., a dropping of the electronic device 200). For example, in one aspect, the electronic device protection apparatus 100 may be composed of a food-grade silicone so as to be highly resistant to damage and degradation, lightweight, non-toxic, etc. The electronic device protection apparatus 100 may be formed in any suitable manner, such as, for example, injection molded, additive manufacturing, compression molding, thermoforming, or in any other suitable manner. The electronic device protection apparatus 100 may further be configured to protect the electronic device 200 from damage related to liquids, dust or other hazards.

In one aspect, the base section 120 and the rim section 140 of the electronic device protection apparatus 100 are formed as a one piece unitary member. In one aspect, the base section 120 and the rim section are formed as at least two pieces, that couple together to form the retaining sheath 110. In one aspect, the base section 120 and the rim section 140 may be formed in any suitable manner.

Figures 4A, 4B, 4C:
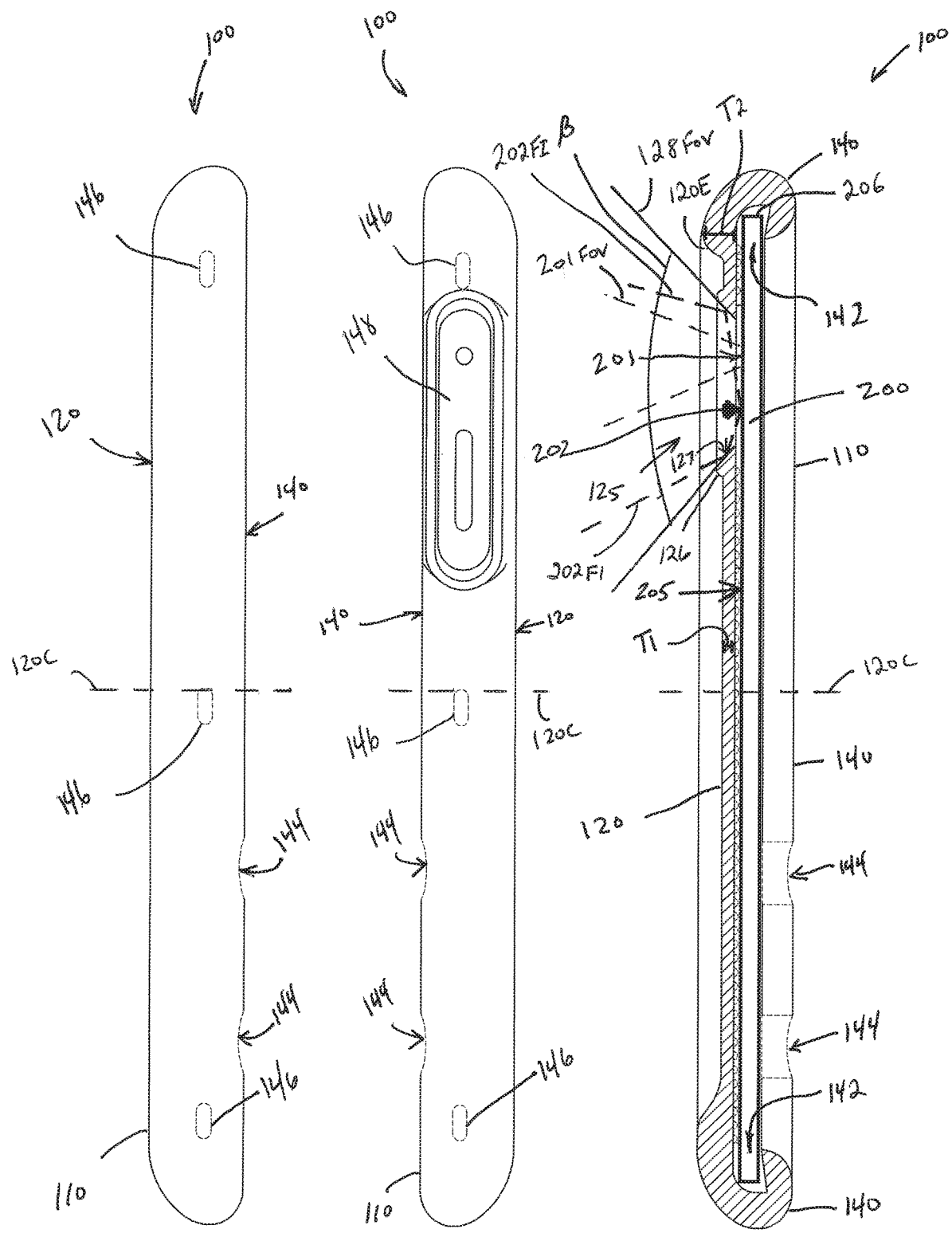
FIGS. 4A-4B are schematic left-side and right-side view illustrations, respectively, of the exemplary apparatus of FIG. 1 in accordance with one or more aspects of the present disclosure.
FIG. 4C is a schematic cross-sectional view illustration of a portion of the exemplary apparatus of FIG. 1 in accordance with one or more aspects of the present disclosure.
Figure 5A:
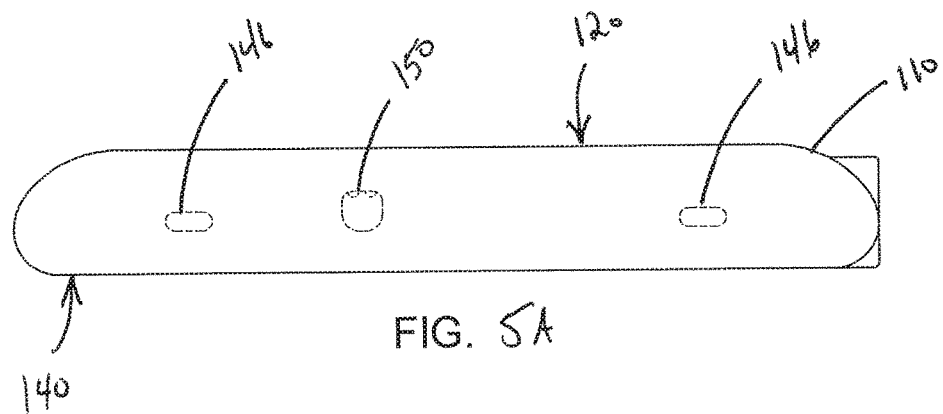
FIGS. 5A-5B are schematic top and bottom view illustrations, respectively, of the exemplary apparatus of FIG. 1 in accordance with one or more aspects of the present disclosure.
Figure 5B:
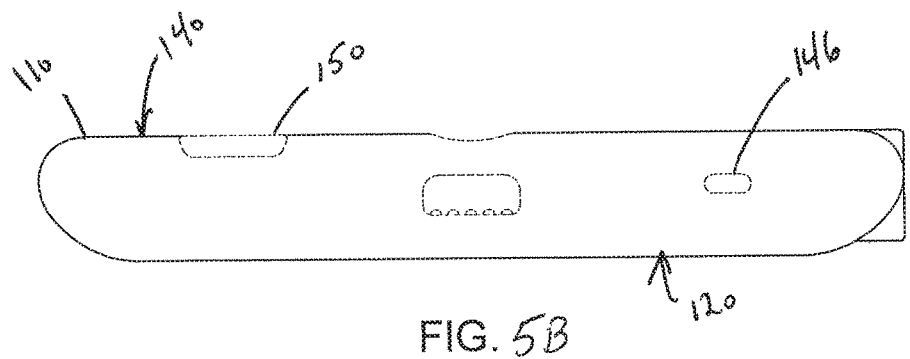
Figure 5C:
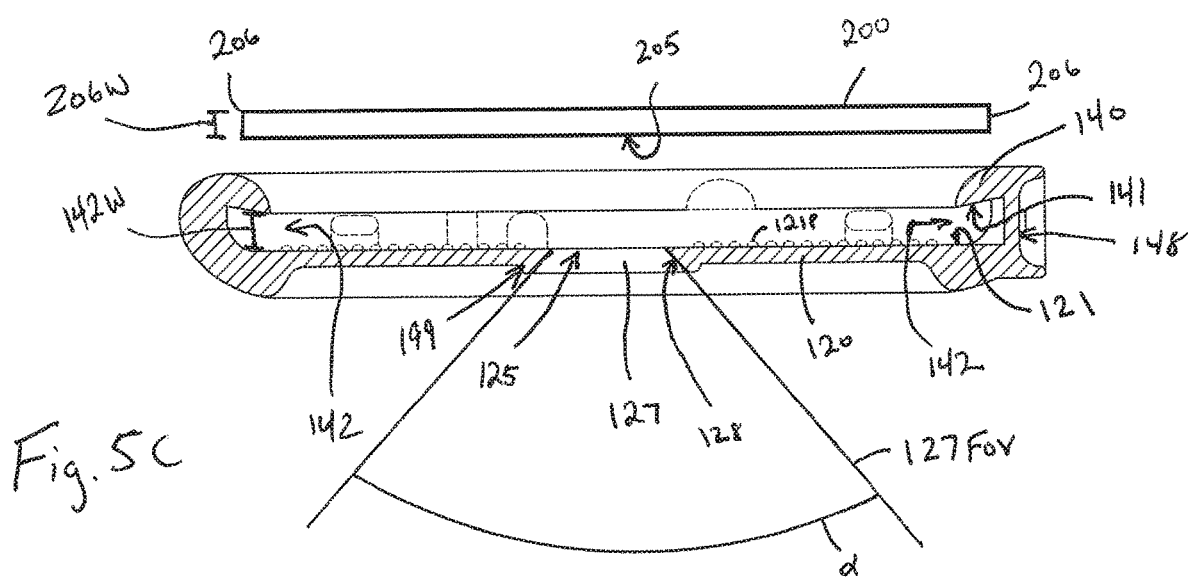
FIG. 5C is a schematic cross-sectional view illustration of a portion of the exemplary apparatus of FIG. 1 in accordance with one or more aspects of the present disclosure.

Still referring to FIGS. 1-4C, the base section 120 of the retaining sheath 110 includes a first engagement surface 121 and an outer surface 122. The first engagement surface 121 is configured to engage with and grip a rear surface 205 (FIG. 4C) of the electronic device 200. The first engagement surface 121 may be a textured surface (e.g., including multiple projections 121P projecting from the first engagement surface 121), may be a smooth surface, or may be any suitable surface to engage and grip the rear surface 205. The second outer surface 122 may be a substantially flat surface or may include projections so as to provide a user with an ergonomic grip. For example, the base section 120 may have an increased thickness, e.g., along the outermost edge 120E of the base section 120, as seen in FIG. 4C. The base section 120 may have a first thickness T1 near a center 120C of the base section 120 and an increased second thickness T2 near the edges 120E. As noted above, the increased second thickness T2 may provide an ergonomic grip, but may also provide the electronic device protection apparatus 100 with extra shock absorption in the event of the electronic device protection apparatus 100 being dropped. The base section 120 may be disposed so as to substantially cover the rear surface 205 of the electronic device 200. In one aspect, as seen in FIG. 3, the base section 120 has a length 120L that extends longitudinally along longitudinal axis A and a lateral width 120W that may be smaller than the length 120L. In other aspect, the base section 120 may have any suitable length 120L and lateral width 120W Referring now to FIGS. 1-5C, the rim section 140 includes a second engagement surface 141 and an inner channel 142. In one aspect, the rim section 140 is flexible; while in other aspects, the rim section 140 is rigid. The rim section 140 is configured to conform to the peripheral form of the electronic device 200 and form a perimeter around an exterior edge 206 (FIG. 4C) of the electronic device 200 when the retaining sheath 110 and the electronic device 200 are mated. For example, in one aspect, the rim section 140 of the retaining sheath 110 depends from the base section 120 so as to form the inner channel 142 configured to receive and retain an exterior edge 206 of the electronic device 200. The rim section 140 extends from each side of the base section 120 so as to surround the electronic device 200 disposed on the first engagement surface 121 of the base section 120. As illustrated in FIG. 5C, the rim section 140 extends from each side of the base section 120 towards a center 120C of the base section 120 such that the second engagement surface 141 is disposed adjacent to and spaced from the first engagement surface 121. The second engagement surface 141 is adjacent to and is spaced from the first engagement surface 121 such that the first engagement surface 121 on the base section 120 opposes the second engagement surface 141 on the rim section 140 and forms the inner channel 142 between the rim section 140 and the base section 120. The inner channel 142 generally has a channel width 142W corresponding to an edge width 206W of the exterior edge 206 of the electronic device 200 such that the exterior edge 206 may be inserted into the inner channel 142. In one aspect, the channel width 142W is sized relative to the exterior edge 206 of the electronic device 200 to have an interference fit so that the electronic device 200 is self-retained in the retaining sheath 110. As described above, the first engagement surface 121 and the second engagement surface 141 form the walls of the inner channel 142.

Referring to FIGS. 1, 2, 3, 4C, and 5C, the retaining sheath 110 may further include at least one aperture 125 defined by and extending through the retaining sheath 110. The at least one aperture 125 is configured so as to expose the camera 201 and/or flash unit 202 of the electronic device 200. The at least one aperture 125 generally conforms to a respective model of the electronic device 200 and may be any suitable shape, such as, a substantially square aperture 125 (FIGS. 1-3), a substantially circular aperture 125' (FIG. 6-6C), a laterally elongated aperture 125" (FIGS. 7-7C), a longitudinally elongated aperture 125''' (FIGS. 8-8C), or any other suitable shape. A location of the at least one aperture 125 generally corresponds to a location of a rear or front facing camera of the electronic device 200. In one aspect, the at least one aperture 125 is at least large enough so that the lens 201L and the flash unit 202 of the camera 201 are not obstructed, but may be larger. In other aspect, the at least one aperture 125 may be two apertures each correspond to a respective camera 201 and flash unit 202.

Referring now to FIGS. 1, 2, 4C, and 5C the retaining sheath 110 further includes at least one camera hood 126. In one aspect, the at least one camera hood 126 depends from the retaining sheath 110. For example, in one aspect, the at least one camera hood 126 depends from the base section 120 of the retaining sheath 110 such that the at least one camera hood 126 and the base section 110 are one unitary member. In another aspect, the at least one camera hood 126 depends from the rim section 140 of the retaining sheath 110 such that the at least one camera hood 126 and the rim section 140 are one unitary member. The at least one camera hood 126 depending from either the base section 120 or the rim section 140 projects outward away from the electronic device 200 positioned in the retaining sheath 110. In one aspect, the at least one camera hood 126 at least partially surrounds the at least one aperture 125; while in other aspects, the at least one camera hood 126 entirely surrounds the at least one aperture 125. In one aspect, the at least one camera hood 126 defines at least a portion of the at least one aperture 125.

Generally, the at least one camera hood 126 surrounding the at least one aperture 125 radiates away from the at least one aperture 125 and is configured to substantially eliminate glare in photographs/videos cause by reflected flash from the unit 202. In one aspect, the at least one hood 126 is offset from the rim section 140 such that the at least one hood 126 has a standoff projection from the base section 120 based on a dimension of the rim section 140 so as to form an impact bumper 199 for the camera 201 and flash unit 202. Referring to FIGS. 1, 4C, and 5C, in the aspect where the aperture 125 is substantially square, the at least one hood 126 includes lateral surfaces 127 and longitudinal surfaces 128 that are tapered or angled up, away from the at least one aperture 125 to effect the anti-reflectiveness of the at least one hood 126. The lateral surfaces 127 are arranged relative to one another so as to form an angle α defining a lateral angle of view 127FOV. The longitudinal surfaces 128 are arranged relative to one another so as to form an angle β defining a longitudinal angle of view 128FOV. The lateral angle of view 127FOV and longitudinal angle of view 128FOV form an overall camera hood field of view 126FOV which is configured so as to define a non-reflective pass through, non-reflective of flash illumination 202FI (FIG. 4C) of the flash unit 202 with respect to the camera 201. The so that the field of view 201FOV of the camera 201 is unobstructed by the retaining sheath 110 or the camera hood 126. Moreover, the position of the lateral and longitudinal surfaces 127, 128 and the angles α, β of the lateral and longitudinal surfaces 127, 128, with respect to the camera field of view 201 and flash illumination 202FI, reflect the flash illumination incident on the lateral and longitudinal surfaces 127, 128 and direct the flash illumination incident away from a lens of the camera 201 with substantially no reflection of the flash incident on the camera lens.

Figure 6A:
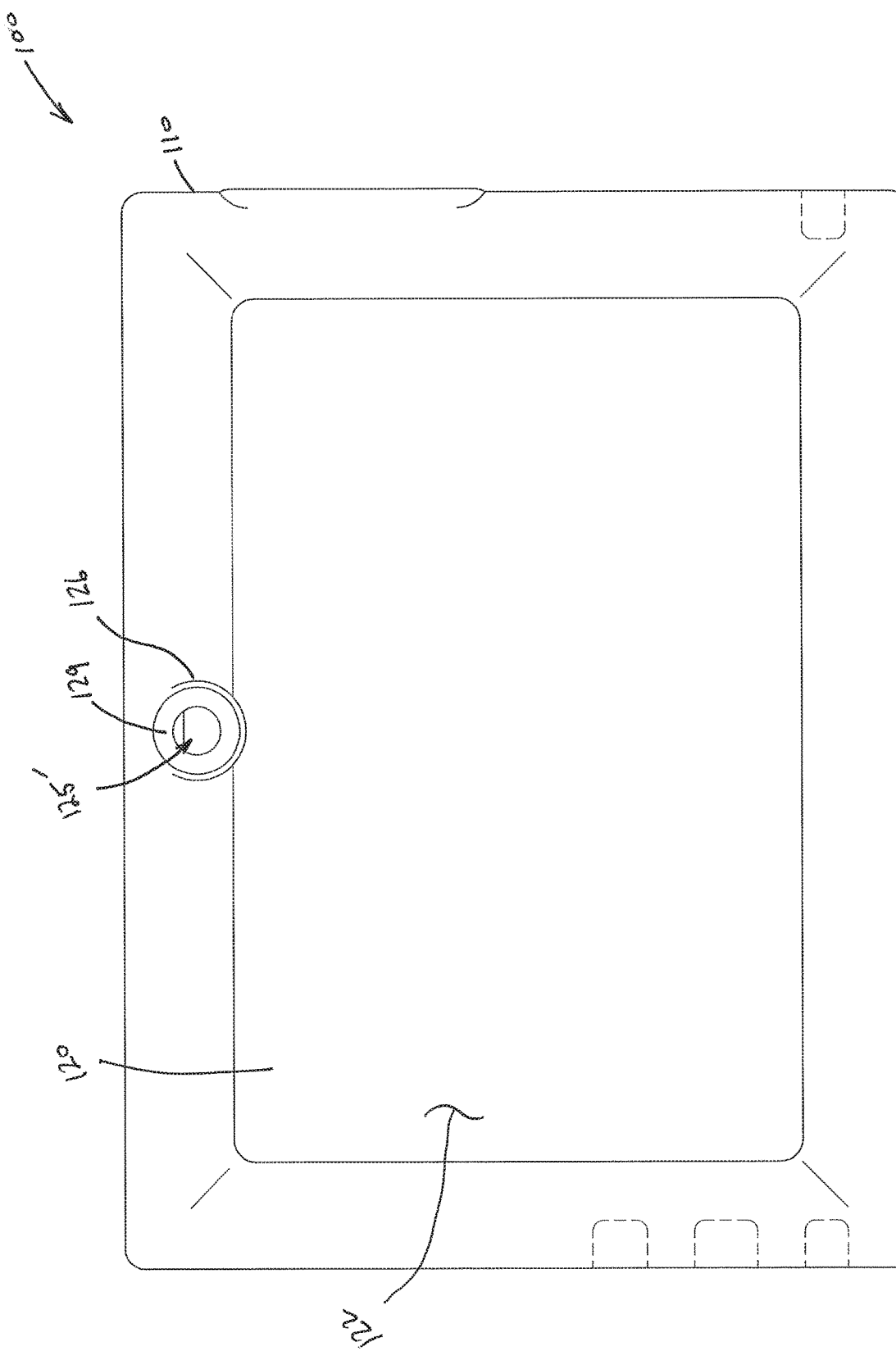
FIG. 6A is a schematic back view illustration of the exemplary apparatus of FIG. 6 in accordance with one or more aspects of the present disclosure.
Figure 6B:
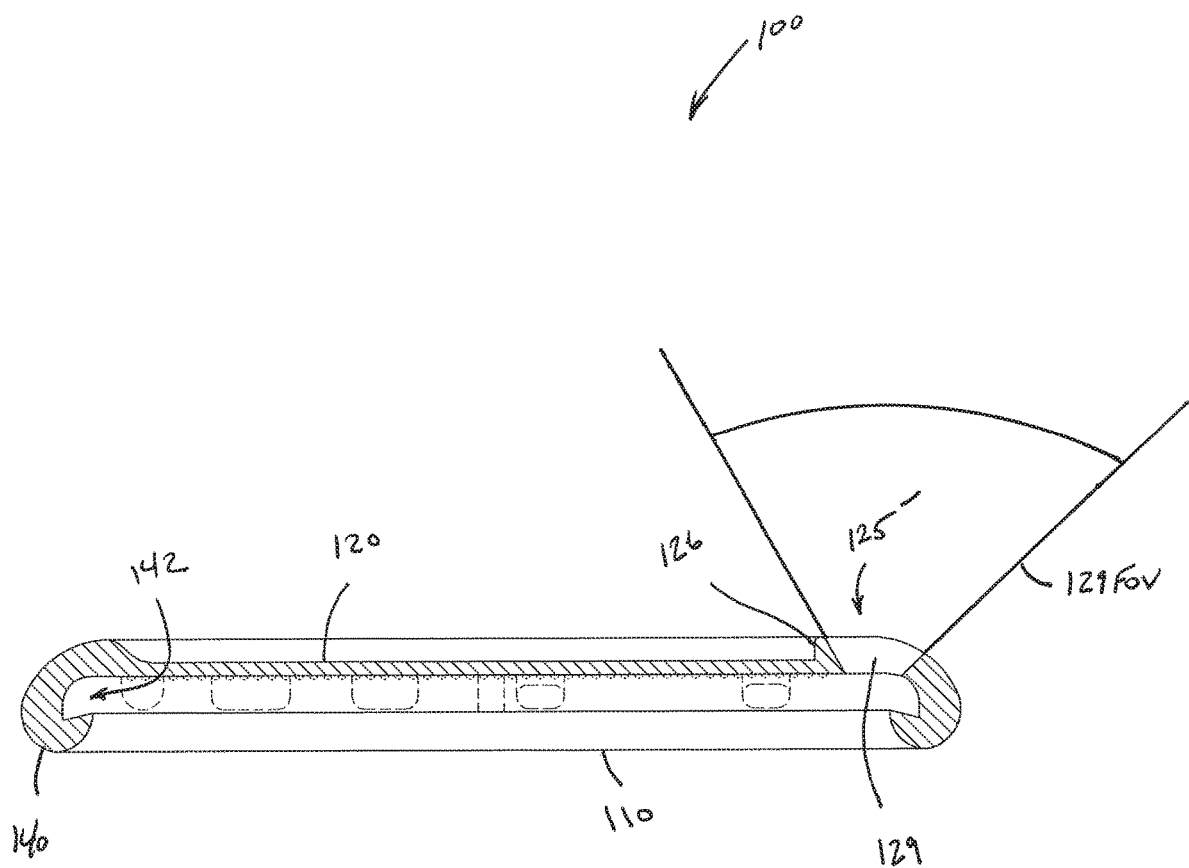

Referring to FIGS. 6-6C, in the aspect where the aperture 125 is a substantially circular aperture 125', the at least one hood 126 includes a conical shaped surface 129 disposed around the circular aperture 125'. The conical shaped surface 129 has a conical field of view 129FOV that is larger than the field of view 201FOV of camera 201 (FIG. 4C) so that the field of view 201FOV of the camera 201 is unobstructed by the retaining sheath 110 or the camera hood 126.

Figure 7:
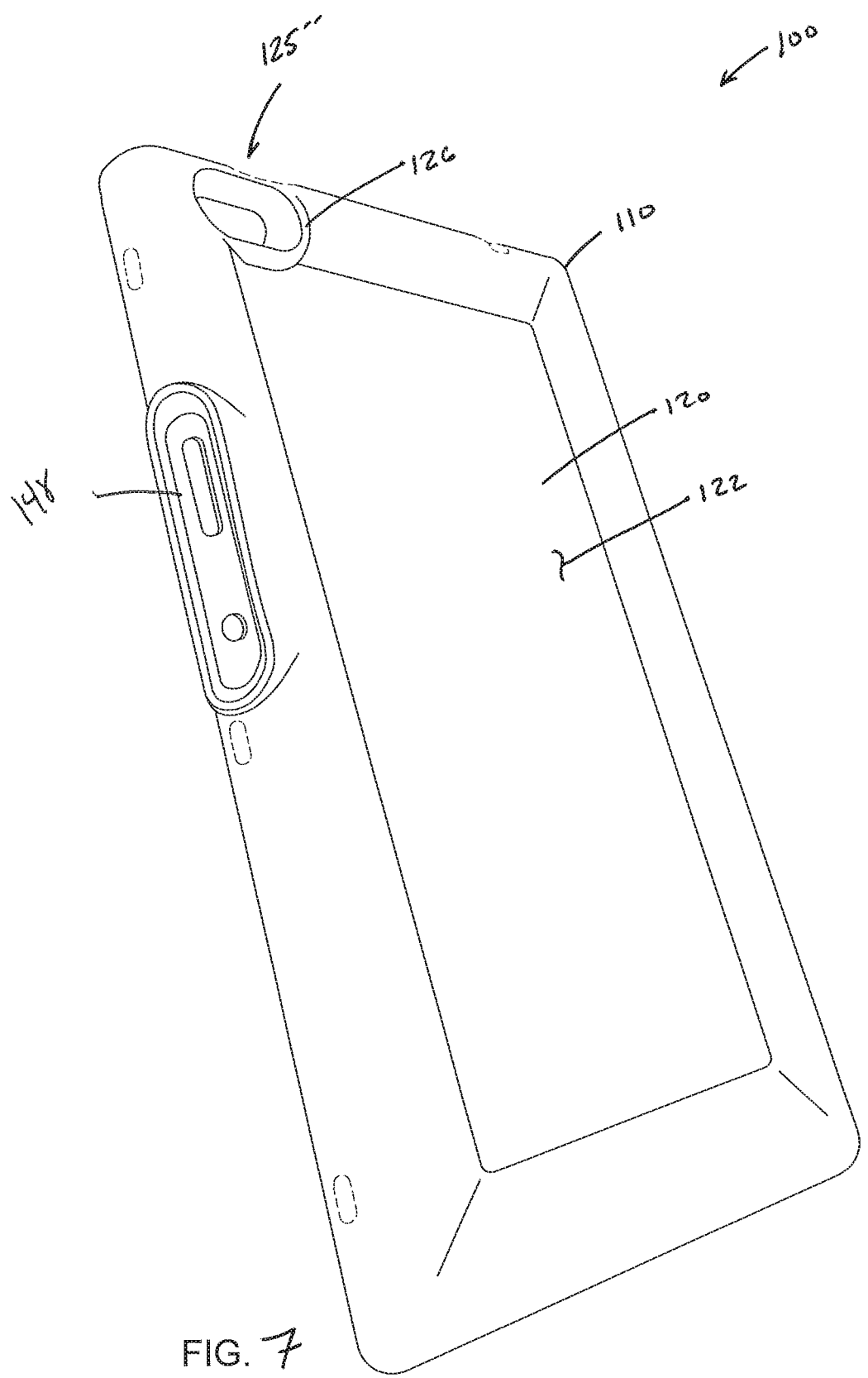
FIG. 7 is a back-perspective view illustration of an exemplary electronic device protection apparatus in accordance with one or more aspects of the present disclosure.
Figure 7A:
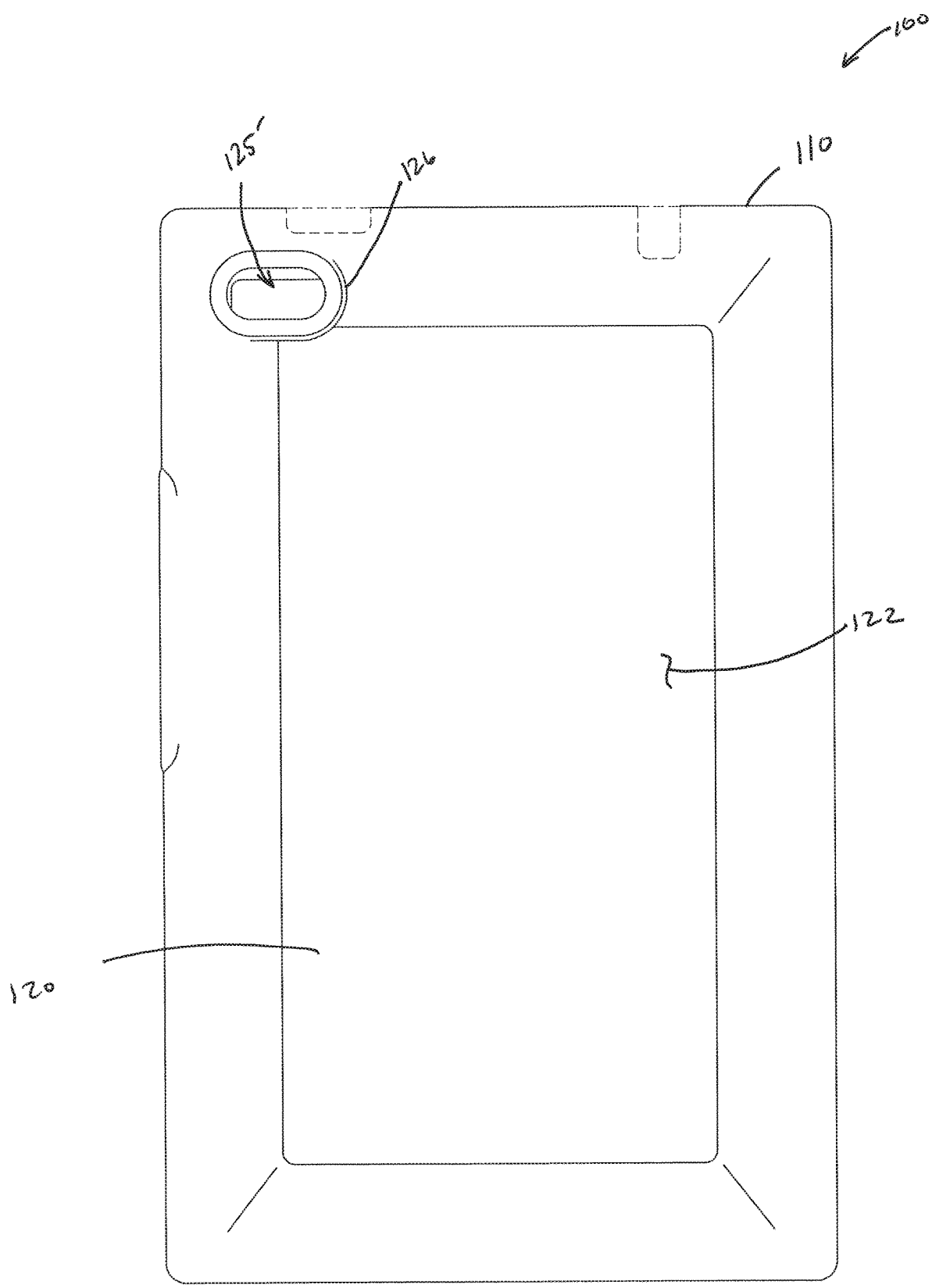
FIG. 7A is a schematic back view illustration of the exemplary apparatus of FIG. 7 in accordance with one or more aspects of the present disclosure.
Figure 7C:
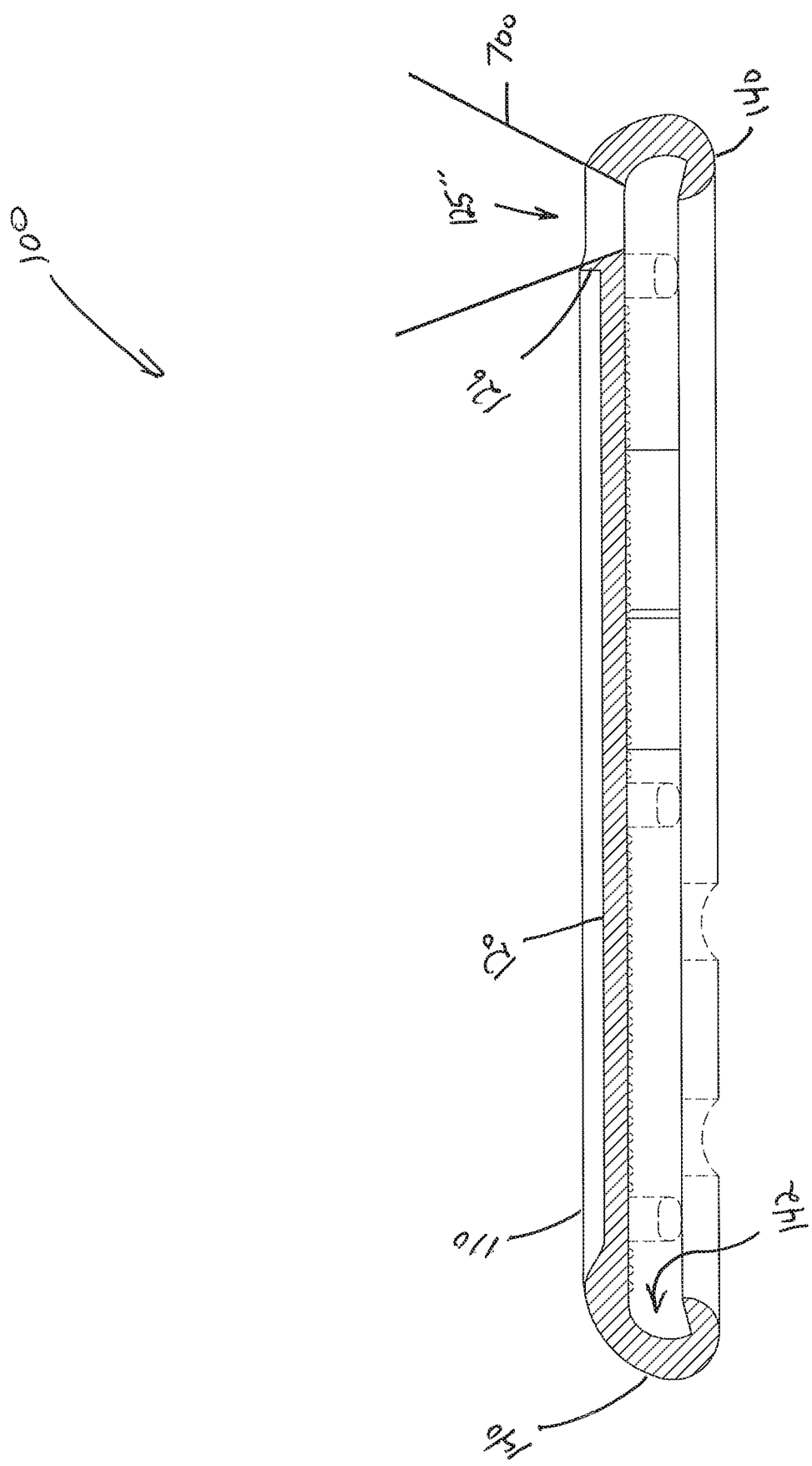

Referring to FIGS. 7-7C, in the aspect where the aperture 125 is the laterally elongated aperture 125", the at least one hood 126 includes a field of view 700 corresponding to the laterally elongated aperture 125". The field of view 700 being larger than the field of view 201FOV of camera 201 (FIG. 4C) so that the field of view 201FOV of the camera 201 is unobstructed by the retaining sheath 110 or the camera hood 126.

Figure 8:
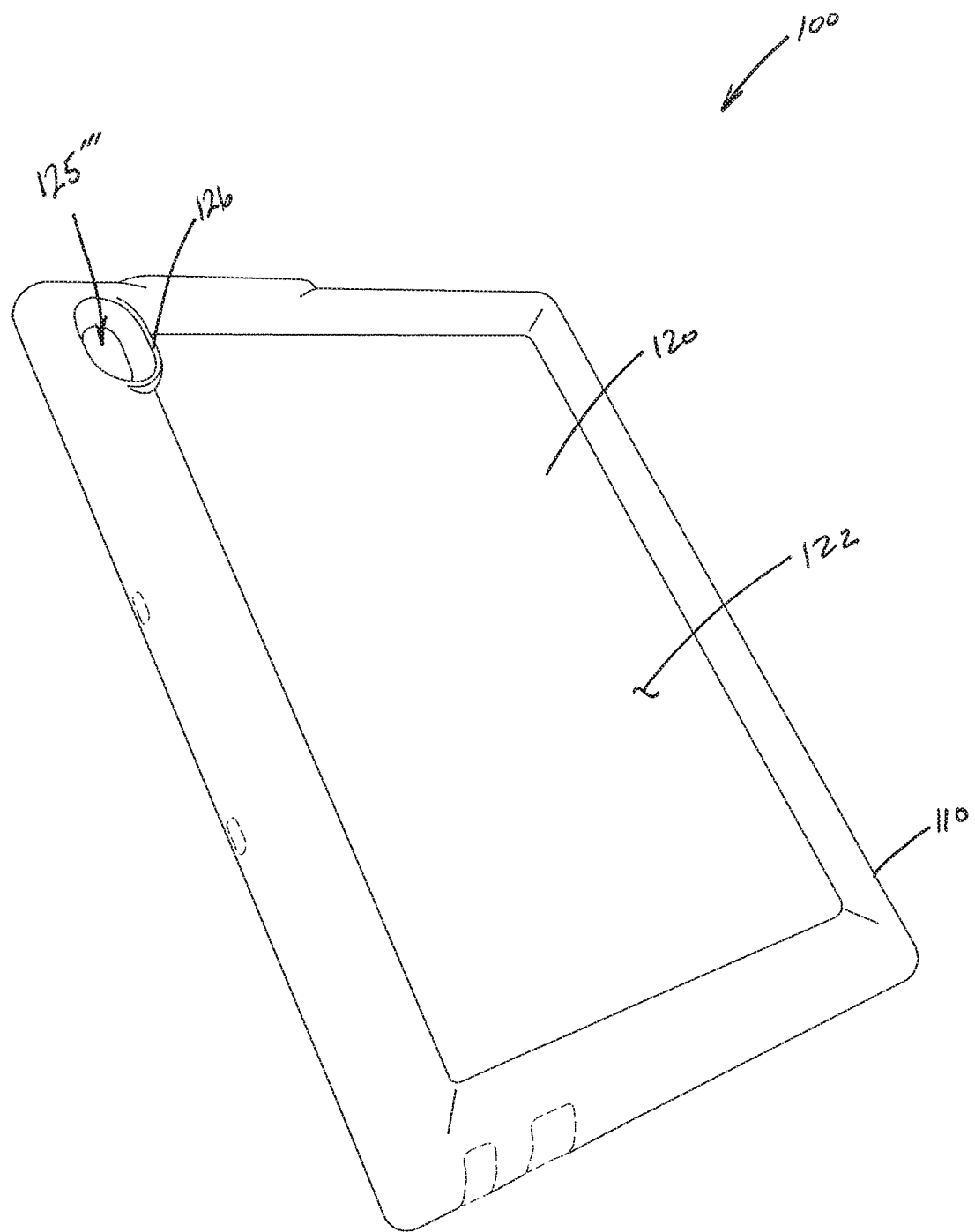
FIG. 8 is a back-perspective view illustration of an exemplary electronic device protection apparatus in accordance with one or more aspects of the present disclosure.
Figure 8A:
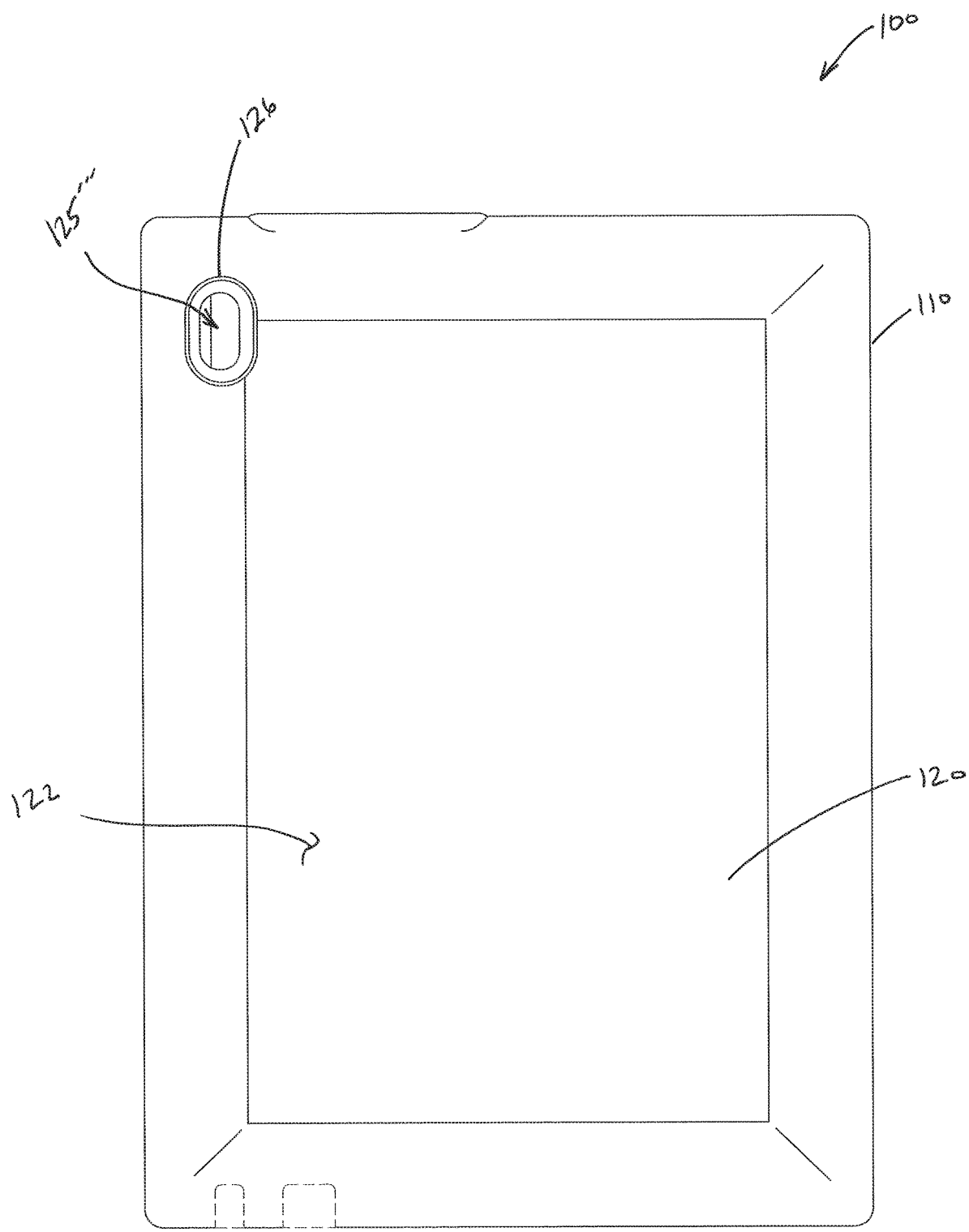
FIG. 8A is a schematic back view illustration of the exemplary apparatus of FIG. 8 in accordance with one or more aspects of the present disclosure.
Figure 8C:
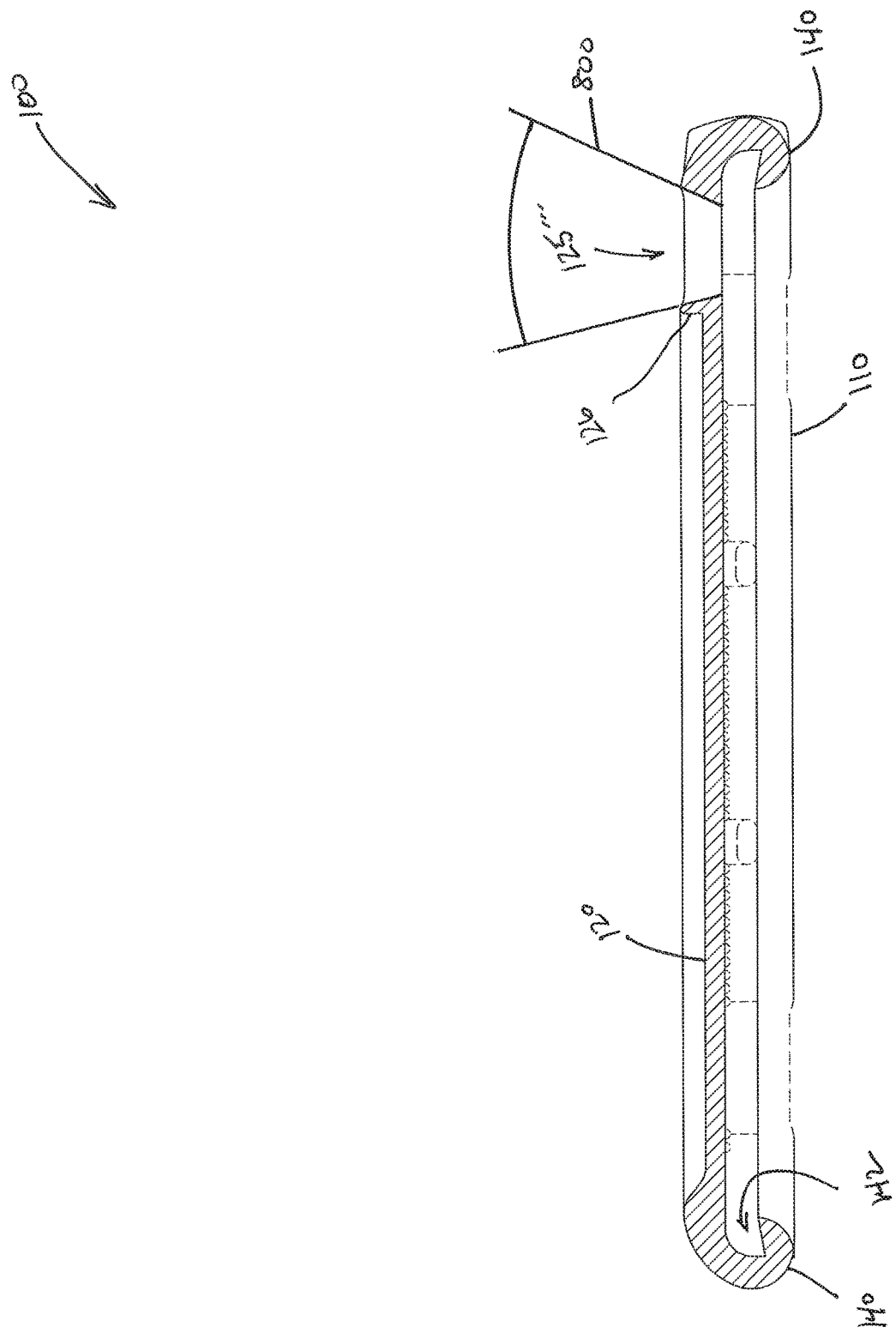

Referring to FIGS. 8-8C, in the aspect where the aperture 125 is the longitudinally elongated aperture 125''', the at least one hood 126 includes a field of view 800 corresponding to the longitudinally elongated aperture 125'''. The field of view 800 being larger than the field of view 201FOV of camera 201 (FIG. 4C) so that the field of view 201FOV of the camera 201 is unobstructed by the retaining sheath 110 or the camera hood 126

By forming the camera hood 126 so as to be angled and depend from the retaining sheath 110 as one unitary piece, production cost may be reduced as additional glare reducing plastic pieces or paint does not have to be added to the electronic device protection apparatus 100.

Referring to FIGS. 1, 4A and 4B, the rim section 140 of the retaining sheath 110 may further include a plurality of air channels 146 configured to effect passive air cooling of the electronic device 200. Air may enter any one of the plurality of air channels 146, flow between a rear surface 205 of the electronic device 200 and the base section 120, and exit through any other one of the plurality of air channels 146. The first engagement surface 121 of the base section 120 may be configured to effect air flow through the area bounded by the retaining sheath 110 and the rear surface 205 of the electronic device 200 (e.g., the projections 121P forming the textured surface may allow air to flow between the rear surface 205 and the base section 120).

Referring to FIGS. 1, 3, 4B, and 5B, the base section 120 and the rim section 140 of the retaining sheath 110 may further include apertures or covers conforming to switches, buttons, ports, speakers, microphones or other components of the respective model of the electronic device 200 which are disposed on the exterior of the electronic device 200. The apertures/covers may include at least one auxiliary cover 148 and/or at least one sound aperture 150 (FIG. 3). The at least one sound aperture 150 may correspond to the respective locations of one or more speakers and one or more microphones of the electronic device 200. The at least one sound aperture 150 may also be configured to amplify the sound heard by the electronic device 200 user by, for example, the use of one or a combination of reverberating chambers and orientation of the at least one sound aperture to direct the sound towards the electronic device 200 user. The at least one auxiliary aperture 148 may correspond to a respective location of one or more components disposed on the exterior of the electronic device 200 such as, but not limited to, switches, buttons, ports (for example, charging, or sound or video input/output ports) or any other components of the electronic device 200.

Referring to FIGS. 3 and 4A-4C, the ring section 140 may further include at least one fingerswipe indentation 144. The at least one fingerswipe indentation 144, being configured to interface with the touch-sensitive display region of the electronic device 200 so as to effect off-screen swiping functionality of a GUI of the touch-sensitive display region of the electronic device 200 retained in the electronic device protection apparatus 100.

In accordance with one or more aspects of the present disclosure an electronic device protection apparatus conformal with an electronic device is provided. The electric device protection apparatus includes a retaining sheath having a base section disposed so as to substantially cover the rear of the electronic device, and a rim section, including an inner channel, forming a perimeter around and receiving an exterior edge of the electronic device into the inner channel, at least one aperture defined by and extending through one or more of the base section and the rim section, the aperture configured such that an edge of the aperture at least partially surrounds a camera and flash unit of the electronic device, and at least one hood defined by and projecting from the one or more of the base section and the rim section such that the at least one hood and the one or more of the base section and the rim section are a unitary member, wherein the at least one hood substantially surrounds at least a portion of the edge of the at least one aperture and is configured so as to define a non-reflective pass through, non-reflective of flash illumination of the flash unit with respect to the camera.

In accordance with one or more aspects of the present disclosure the at least one hood defines at least a portion of the at least one aperture.

In accordance with one or more aspects of the present disclosure the at least one hood is disposed on the one or more of the base section and the rim section in a predetermined location based on a respective model of the electronic device.

In accordance with one or more aspects of the present disclosure the electronic device protection apparatus comprises a food grade silicone.

In accordance with one or more aspects of the present disclosure the at least one aperture is substantially circular and the at least one camera hood is formed in a conical shape.

In accordance with one or more aspects of the present disclosure the at least one aperture is substantially square and each edge of the at least one camera hood surrounding the square aperture is angled away from the at least one aperture so as to define an anti-reflective angle of view disposed relative to an angle of view of a camera of the electronic device so that reflective flash illumination is direct away from the camera lens.

In accordance with one or more aspects of the present disclosure a combination of the base section and the rim section securely orients the at least one aperture with a respective camera and flash unit.

In accordance with one or more aspects of the present disclosure the rim section includes an inner channel configured to receive the exterior edge of the electronic device.

In accordance with one or more aspects of the present disclosure the base section and the rim section are a single unitary member.

In accordance with one or more aspects of the present disclosure the base section and the rim section are separate and distinct from one another and couple together to form the retaining sheath.

In accordance with one or more aspects of the present disclosure the at least one hood is offset from the rim section and includes a standoff projection from the base section based on a dimension of the rim section so as to form an impact bumper for the camera and flash unit.

In accordance with one or more aspects of the present disclosure an electronic device protection apparatus conformal with an electronic device is provided. The electronic device protection apparatus includes a retaining sheath having a base section configured so as to substantially cover a rear surface of the electronic device, and a rim section configured to securely grip and form a perimeter around an exterior edge of the electronic device, and at least one camera aperture disposed on at least one of the base section or the rim section in a predetermined location based on a respective model of the electronic device, the at least one camera aperture extending through the at least one of the base section or the rim section and defining a non-reflective pass through, non-reflective of flash illumination of the flash unit with respect to the camera so as to effect an anti-reflective angle of view disposed relative to an angle of view of a lens of a camera and a flash unit of the electronic device so that reflective flash illumination is directed away from the camera lens, wherein a combination of the base section and the rim section is configured to securely orient the at least one camera aperture with at least one respective predetermined area of the electronic device relative to the camera and the flash unit of the electronic device.

In accordance with one or more aspects of the present disclosure the electronic device protection apparatus comprises a food grade silicone.

In accordance with one or more aspects of the present disclosure the at least one camera aperture is substantially conical shape.

In accordance with one or more aspects of the present disclosure the at least one camera aperture is a substantially square shape.

In accordance with one or more aspects of the present disclosure a combination of the base section and the rim section securely orients the at least one camera aperture with a respective camera and flash unit.

In accordance with one or more aspects of the present disclosure the rim section includes an inner channel configured to receive the exterior edge of the electronic device.

In accordance with one or more aspects of the present disclosure the base section and the rim section are a single unitary member.

In accordance with one or more aspects of the present disclosure the base section and the rim section are separate and distinct from one another and couple together to form the retaining sheath.

In accordance with one or more aspects of the present disclosure the at least one camera aperture is offset from the rim section and includes a standoff projection from the base section based on a dimension of the rim section so as to form an impact bumper for the camera and flash unit.

It should be understood that the exemplary embodiment disclosed herein can be used individually or in any suitable combination thereof. It should also be understood that the foregoing description is only illustrative of the embodiment. Various alternatives and modifications can be devised by those skilled in the art without departing from the embodiment. Accordingly, the present embodiment is intended to embrace all such alternatives, modifications and variances.

What is claimed is:

1. An electronic device protection apparatus conformal with an electronic device, the electric device protection apparatus comprising:
   a retaining sheath having a base section having a substantially flat outermost surface and an innermost surface, the base section being disposed so as to substantially cover the rear of the electronic device, and a rim section, including an inner channel, forming a perimeter around and receiving an exterior edge of the electronic device into the inner channel;
   at least one aperture defined by and extending through one or more of the base section and the rim section, the aperture configured such that an edge of the aperture at least partially surrounds a camera and flash unit of the electronic device; and
   at least one hood defined by and projecting outward from the one or more of the substantially flat outermost surface of the base section and the rim section such that the at least one hood and the one or more of the base section and the rim section are a unitary member, wherein the at least one hood substantially surrounds at least a portion of the edge of the at least one aperture and is configured so as to define a non-reflective pass through, non-reflective of flash illumination of the flash unit with respect to the camera.

2. The electronic device protection apparatus of claim 1, wherein the at least one hood defines at least a portion of the at least one aperture.

3. The electronic device protection apparatus of claim 1, wherein the at least one hood is disposed on the one or more of the base section and the rim section in a predetermined location based on a respective model of the electronic device.

4. The electronic device protection apparatus of claim 1, wherein the electronic device protection apparatus comprises a food grade silicone.

5. The electronic device protection apparatus of claim 1, wherein the at least one aperture is substantially circular and the at least one camera hood is formed in a conical shape.

6. The electronic device protection apparatus of claim 1, wherein the at least one aperture is substantially square and each edge of the at least one camera hood surrounding the square aperture is angled away from the at least one aperture so as to define an anti-reflective angle of view disposed relative to an angle of view of a camera of the electronic device so that reflective flash illumination is direct away from the camera lens.

7. The electronic device protection apparatus of claim 1, wherein a combination of the base section and the rim section securely orients the at least one aperture with a respective camera and flash unit.

8. The electronic device protection apparatus of claim 1, wherein the rim section includes an inner channel configured to receive the exterior edge of the electronic device.

9. The electronic device protection apparatus of claim 1, wherein the base section and the rim section are a single unitary member.

10. The electronic device protection apparatus of claim 1, wherein the base section and the rim section are separate and distinct from one another and couple together to form the retaining sheath.

11. The electronic device protection apparatus of claim 1, wherein the at least one hood is offset from the rim section and includes a standoff projection from the base section based on a dimension of the rim section so as to form an impact bumper for the camera and flash unit.

12. An electronic device protection apparatus conformal with an electronic device, the electronic device protection apparatus comprising:
    a retaining sheath having
        a base section having a substantially flat outermost surface and an innermost surface, the base section being configured so as to substantially cover a rear surface of the electronic device, and
        a rim section configured to securely grip and form a perimeter around an exterior edge of the electronic device; and
    at least one camera aperture disposed on at least one of the base section or the rim section in a predetermined location based on a respective model of the electronic device, the at least one camera aperture being disposed so as to extend through the at least one of the base section or the rim section with at least a portion of the at least one camera aperture projecting outward from the substantially flat outermost surface of the base section or the rim section and defining a non-reflective pass through, non-reflective of flash illumination of the flash unit with respect to the camera so as to effect an anti-reflective angle of view disposed relative to an angle of view of a lens of a camera and a flash unit of the electronic device so that reflective flash illumination is directed away from the camera lens,
    wherein a combination of the base section and the rim section is configured to securely orient the at least one camera aperture with at least one respective predetermined area of the electronic device relative to the camera and the flash unit of the electronic device.

13. The electronic device protection apparatus of claim 12, wherein the electronic device protection apparatus comprises a food grade silicone.

14. The electronic device protection apparatus of claim 12, wherein the at least one camera aperture is substantially conical shape.

15. The electronic device protection apparatus of claim 12, wherein the at least one camera aperture is a substantially square shape.

16. The electronic device protection apparatus of claim 12, wherein a combination of the base section and the rim section securely orients the at least one camera aperture with a respective camera and flash unit.

17. The electronic device protection apparatus of claim 12, wherein the rim section includes an inner channel configured to receive the exterior edge of the electronic device.

18. The electronic device protection apparatus of claim 12, wherein the base section and the rim section are a single unitary member.

19. The electronic device protection apparatus of claim 12, wherein the base section and the rim section are separate and distinct from one another and couple together to form the retaining sheath.

20. The electronic device protection apparatus of claim 12, wherein the at least one camera aperture is offset from the rim section and includes a standoff projection from the base section based on a dimension of the rim section so as to form an impact bumper for the camera and flash unit.

* * * * *

UNITED STATES PATENT AND TRADEMARK OFFICE
CERTIFICATE OF CORRECTION

| | | |
|---|---|---|
| PATENT NO. | : 10,667,587 B1 | Page 1 of 1 |
| APPLICATION NO. | : 16/205894 | |
| DATED | : June 2, 2020 | |
| INVENTOR(S) | : Shannon, III | |

It is certified that error appears in the above-identified patent and that said Letters Patent is hereby corrected as shown below:

On the Title Page

Item (73) Assignee: "BobjGear, LLC, Clermont, CT(US)" should be "BobjGear, LLC, Clermont, FL (US)"

Signed and Sealed this
Thirtieth Day of August, 2022

Katherine Kelly Vidal
*Director of the United States Patent and Trademark Office*